Patented July 6, 1954

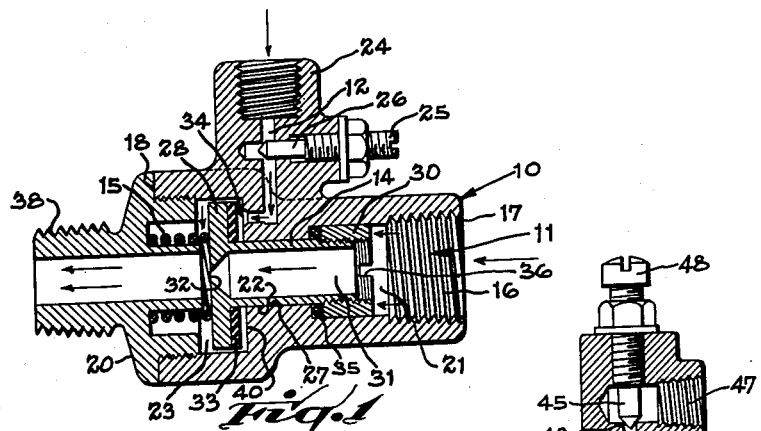

2,682,883

UNITED STATES PATENT OFFICE 2,682,883

PROPORTIONER

Benjamin Phillips, Cincinnati, Ohio

Application December 7, 1950, Serial No. 199,657

9 Claims. (Cl. 137—88)

This invention relates to proportioners of the type used to control the injection of one fluid into another and is particularly directed to a novel type of poportioner which has a self-contained sealing means for preventing contamination or leakage of the additive fluid when the primary fluid is not flowing through the proportioner.

There are many applications in which proportioners are used to control the amount of additive which will be mixed with a given quantity of primary fluid as it flows through a conduit. For example, in dishwashing machines, automatic clothes washers, car washers and the like, a proportioner can be used to control the amount of detergent infused into a stream of water before the water contacts the article being washed.

One of the principal difficulties inherent in any system for injecting an additive into a fluid stream is that of preventing leakage of the additive into the primary fluid conduit when the primary fluid has ceased to flow, and simultaneously preventing any contamination of the additive by seepage of the primary fluid into the additive line. Heretofore, a common means of accomplishing this result has been to provide one or more check valves in the additive and primary fluid supply lines which function to seal each of those lines against back flow from the other when the primary fluid source is disconnected and a static condition prevails. This method is objectionable because of the added cost introduced by the additional parts and labor required, and also because the resulting structure inherently lacks compactness which is often desirable and sometimes essential.

It is an important object of the present invention to eliminate the need for separate check valves by providing in the proportioner a self-contained sealing means which will automatically seal the additive line so as to prevent any leakage of the additive or contamination of it by the primary fluid whenever the primary fluid ceases to flow through the proportioner.

Another advance in the art made by the present invention is occasioned by the fact that in the past little or no effort has been made to secure an optimum intermixture of the additive and the primary fluid within the proportioner. It is highly advantageous to obtain a maximum intermixture of the two fluids especially in devices such as car washers where the interfusion obtained from the additive and primary fluid is sprayed over a large surface area, because the need for supplying an excess quantity of additive to compensate for any non-uniformity in the interfusion is eliminated. The present invention seeks to provide a simple means for securing such an optimum intermixture.

It has been found that in proportioners of the type using the venturi principle to inject the additive into the primary fluid stream that the distance between the end of the primary fluid constriction on one side of the mixing chamber to the point on the opposite side of the chamber at which the primary fluid stream is again confined by the discharge conduit is a critical factor in determining the efficiency of the interfusion of the two fluids.

The distance at which best results are obtained depends upon many variable factors, such as the nature of the fluids being mixed and the relative pressures involved in the additive line and primary fluid conduit. The present invention provides a simple means by which this critical distance, from the end of the primary fluid constriction to the leading edge of the exhaust conduit may be adjusted so as to produce an optimum intermixing of the two fluids. As a result of its simplicity, this adjustment may be made in the field under actual operating conditions, thus allowing these conditions to be taken into account to provide for the most efficient operation of the proportioner as opposed to forcing reliance upon a factory standardized construction which, although generally acceptable, may be highly inefficient in a particular application.

These and other objects of my invention will be apparent from a consideration of the specification taken in conjunction with the drawings, in which:

Figure 1 is a cross sectional view taken along line 1—1 of Figure 3 showing the proportioner plunger in the flow position permitting the additive to be mixed with the primary fluid.

Figure 2 is a view similar to Figure 1 with the plunger shown in the static position and no primary fluid or additive flowing.

Figure 3 is a side elevational view of the outlet end of the proportioner.

Figure 4 is a side elevational view of the inlet end of the proportioner.

Figure 5 is a view similar to Figure 1 showing a modification of the needle valve arrangement.

The proportioner is adapted to be inserted into the primary fluid conduit and also to be connected to the end of an additive supply line. The additive flows from the additive reservoir through the additive supply line, and enters the proportioner where it is injected in a predetermined amount into the primary fluid stream. When the primary fluid ceases to flow through the proportioner, means are provided within it which function to automatically seal the additive line so that the additive fluid may neither escape nor become contaminated.

Generally, the proportioner comprises a housing or body 10 having a main passageway 11 through which the primary fluid passes and an auxiliary bore 12 interconnecting the additive line and the primary fluid passageway 11, a hollow plunger 14 slidably mounted within the main passageway 11 and a spring 15 which biases the plunger 14 so that when the primary fluid ceases to flow the plunger will block the auxiliary bore 12 sealing the additive supply line.

The body is provided with threads 16 at the inlet end 17 for securing it to the primary fluid conduit and at the outlet end 18 for engaging the coupling member 20. The main passageway 11 comprises a series of concentric cylinders defining an inlet chamber 21, a plunger bearing surface 22 and a mixing chamber 23. Connection means comprising an internally threaded boss 24 are provided for joining the body 10 with the additive fluid line. A bore 12 interconnects the additive line and the mixing chamber 23. The set screw 25 provides means for adjusting a needle valve 26 thereby varying the effective cross sectional area of the bore 12 and hence the rate at which the additive may enter the mixing chamber 23.

A plunger 14 is slidably mounted within the main passageway 11. The plunger barrel 27 which engages the bearing surface 22 carries the plunger head 28 disposed within the mixing chamber 23 and the positioning nut 30 disposed within the inlet chamber 21. A bore 31 extends axially of the plunger 14 and is tapered adjacent the head end to form an orifice 32 or constriction which reduces the cross sectional area of the primary fluid stream at that point. The rear surface of the head has a washer 33 secured thereto which is adapted to close off the outlet 34 of the bore 12 interconnecting the mixing chamber 23 and the additive line in order to seal the latter when the primary fluid is not flowing.

A sealing ring 35 is provided over the plunger barrel 27 within the inlet chamber 21 to prevent flow of the primary fluid around the plunger. A positioning nut 30 threadably engages the plunger barrel 27 within the inlet chamber 21 and is provided with a diametral slot 36 so that it may be threaded either inwardly or outwardly along the barrel to vary the distance which the plunger may advance against the spring 15 before the plunger 14 is constrained by the abutment of the positioning nut 30 and the sealing ring 35 which is retained by the shoulder 37 formed between the inlet chamber 21 and the bearing surface 22. The coupling member 20, threadably engaged to the exhaust end 18 of the body 10, functions both to provide a male connection 38 for joining the proportioner to the discharge conduit and also as a housing for the spring 15 which biases the plunger toward the seated position in which the washer 33 secured to the head 28 seals the bore 12 connected to the additive supply line.

Normally, the plunger 14 is held in the seated position against the mixing chamber wall 40 by the spring force exerted upon the plunger head 28. In this position, the additive line is effectively sealed by the washer 33 which is covering the outlet 34 of the bore 12 in the wall 40 of the mixing chamber. However, when fluid starts to flow through the main passageway 11 the force of the fluid acting upon the plunger 14 is great enough to force it axially against the spring 15 until its advance is stopped by the abutment of the positioning nut 30 and the sealing ring 35 which is forced against the shoulder 37.

As the primary fluid passes through the plunger, its cross sectional area is greatly reduced at the orifice or constriction 32 and its velocity is increased with a resultant drop in pressure, which is of such a magnitude that a suction is created. The additive, no longer retained by the washer 33 passes from the additive line through the bore 12, about the plunger head 28, into the mixing chamber 23 and under the effect of the suction created by the primary fluid flow, is drawn into and thoroughly mixed with the primary fluid stream. This inter-mixing action is due to the venturi effect which is produced by the constriction of the primary fluid stream and is of such a nature that the greater the velocity of the primary fluid stream and hence the greater the quantity of primary fluid flowing through the proportioner the greater the amount of additive that will be drawn into the mixing chamber. Thus, a substantially constant ratio is maintained between the amount of primary fluid passing through the proportioner and the amount of additive which is mixed with it. This ratio may be predetermined by an appropriate setting of the set screw 25 to adjust the needle valve 26. The further the needle valve 26 is withdrawn from the position in which it completely blocks the bore 12, the higher the ratio of additive to primary fluid which will be obtained. However, for any particular setting for the needle valve 25, the amount of additive which is drawn into the primary fluid stream is dependent principally upon the velocity of the primary fluid and thus the ratio of additive to primary fluid remains substantially constant over the range of primary fluid flow rates normally encountered.

The only other adjustment provided in the proportioner is accomplished by turning the positioning nut 30 so that it is threaded inwardly or outwardly over the plunger barrel 27. The effect of this adjustment is to alter the distance which the plunger head 28 will advance against the spring force 15 when the primary fluid is flowing through the proportioner. It will be understood that the spring 15 is relatively weak and while it is sufficiently stiff to hold the plunger head in the sealing position against any pressure in the additive line, nevertheless whenever the primary fluid is flowing the plunger will compress the spring until its travel is limited by the abutment of the positioning nut 30 and the sealing ring 35.

As earlier pointed out, it has been found that the distance between the front face of the head 28 where the primary fluid is discharged from the orifice 32 and the point at which the primary fluid stream is again confined by the conduit formed in the coupling member 15 is of critical importance in determining the efficiency with which the additive will be intermixed with the primary fluid. Therefore, by providing a simple adjustment which can be made in the field, under the actual operating conditions of each installation, an optimum intermixture can be obtained which would not be obtainable if no adjustment were provided.

To properly adjust the proportioner, the positioning nut 30 is first set to provide an optimum intermixture of the additive and primary fluid.

Then, in order to establish the ratio desired between thee amount of additive and the amount of primary fluid, the needle valve is adjusted by means of the set screw 25. Unless it is desired to alter this ratio, no further adjustment of the proportioner should be necessary. However, should it be desirable at any time to alter the ratio of additive to primary fluid, the only adjustment required is that of the needle valve which may be made by turning set screw 25 to advance or withdraw the needle valve from its position blocking the bore 12.

In the modification shown in Figure 5, the needle valve 45 may be mounted vertically in alignment with the bore 46. The additive supply line 47 is connected to the bore and the amount of additive fluid flowing may be regulated by turning screw 48 to seat or unseat the valve 45 from the seat 49 provided in the bore 46.

Obviously, various other changes and departures in structure may be made without departing from the principles of the invention.

While the proportioner has been discussed principally in its application to detergent supply systems, it will be understood that the proportioner presents advantages of simplicity and compactness which make its use desirable in many diverse fields. Furthermore, while the device is a simple one, it has proved to be extremely effective for the purpose intended.

Therefore, I desire to be limited only by the following claims.

I claim:

1. A proportioner comprising a housing having a primary fluid passageway for fluid flow therethrough, said passageway having a constriction therein adapted to cause a drop in said primary fluid pressure, means for introducing an additive into said passageway adjacent said constriction, whereby said additive will be interfused with said primary fluid, means disposed within said housing for preventing the flow of the additive into said passageway when the primary fluid is not flowing said latter named means being movable with respect to said housing in response to the primary fluid pressure whereby when said primary fluid pressure is reduced, said latter named means render ineffective said means for introducing the additive.

2. A proportioner comprising, a body having a mixing chamber formed therein, a plunger slidable within said mixing chamber, said plunger having an orifice therein whereby a primary fluid may enter the mixing chamber, said orifice being adapted to cause a drop in said primary fluid pressure, connecting means whereby said body may be joined to an additive line, said body having a bore formed therein interconnecting said additive line and said mixing chamber so that the additive fluid may be drawn into said mixing chamber and interfused with said primary fluid said plunger being movable in response to primary fluid pressure and being effective to seal said bore when no primary fluid is flowing.

3. A proportioner comprising, a body having a mixing chamber formed therein, a plunger slidable within said mixing chamber, said plunger having an orifice therein whereby primary fluid may enter the mixing chamber, connecting means for joining the body to an additive line, said body having a bore formed therein to interconnect said additive line and the mixing chamber, means urging said plunger to a position sealing said bore when no primary fluid is flowing but allowing the plunger to be moved by the primary fluid pressure to a position remote from said bore when primary fluid is flowing so that the additive fluid and primary fluid may be intermixed.

4. A proportioner comprising, a housing configurated internally to form concentric cylinders defining a bearing surface and a mixing chamber, connecting means for joining the housing to an additive line, said housing having a bore therein for interconnecting said additive line and said mixing chamber, a plunger barrel slidable within said bearing surface, said plunger barrel carrying a head disposed within the mixing chamber said plunger having a bore extending therethrough for introducing primary fluid into said mixing chamber, spring means urging said plunger head to a position in which it seals the bore, when no primary fluid is flowing and is allowed to advance to a position remote from said first named bore when the primary fluid is flowing.

5. A proportioner comprising, a body configurated internally to form a series of concentric cylinders defining an inlet chamber, connecting means for joining the body to an additive line, said body having a bore which interconnects said additive line and said mixing chamber, a plunger barrel slidable within said bearing surface, said plunger carrying a head disposed within the mixing chamber said plunger having a bore extending therethrough terminating in an orifice communicating with said mixing chamber, said plunger bore and orifice providing a passageway for a primary fluid, spring means urging said plunger head to a position in which it seals the bore, when no primary fluid is flowing and allowing it to advance to a position remote from said bore when the primary fluid is flowing, a positioning nut threadably engaging said plunger barrel, said positioning nut being disposed within the inlet chamber and adapted to cooperate with the body to limit the advance of the plunger head when the primary fluid is flowing, whereby an optimum inter-mixture of the additive fluid and primary fluid may be secured.

6. In a proportioner, the combination of a housing configurated internally to form a passageway for a primary fluid, a plunger slidably mounted in said passageway, said plunger having an axial bore therethrough and a constriction in said bore, said primary fluid passing through said bore and said constriction, spring means urging said plunger in a direction opposite that of the primary fluid flow, a coupling member defining the leading end of the discharge conduit, a positioning nut mounted upon said plunger for cooperation with said housing, whereby the travel of said plunger is selectively limited to control the distance from said constriction to the leading end of the discharge conduit.

7. A proportioner comprising a body which is configurated internally to provide a primary fluid passageway and a mixing chamber, connecting means whereby said body may be joined to an additive fluid line, said body having a first bore formed therein for interconnecting said passageway and said additive line, a plunger slidable within said passageway and mixing chamber, said plunger having a second bore extending therethrough, a constriction in the second bore adjacent the portion of the plunger disposed within the mixing chamber, spring means urging said plunger to a position in which it blocks said first bore when no primary fluid is flowing, but which permits the plunger to be moved by the primary fluid pressure in a direction parallel to the primary fluid flow, to a position in which the first bore is not blocked when the primary fluid is flowing.

8. A proportioner comprising a housing having an inlet end and a discharge end, said housing being configurated internally to form a mixing chamber, a plunger slidably mounted in said housing, said plunger having a bore extending therethrough in communication with the inlet end and discharge end of said housing to permit the flow of a primary fluid through said housing and a constriction in said bore, and a positioning nut associated with said plunger and adapted for cooperative engagement with said housing for limiting the travel of said plunger and adjusting the position of said constriction relative to the discharge end of the housing.

9. A proportioner comprising a housing having a primary fluid passageway extending therethrough, connecting means for joining said housing to a source of additive fluid, said housing having a first bore formed therein for interconnecting said additive fluid source and said passageway, a plunger slidably mounted in said passageway, spring means normally urging said plunger to a sealing position wherein it covers said bore, said plunger having a second bore extending therethrough adapted to permit primary fluid to flow therein, said second bore terminating in a constriction adjacent said first named bore, said plunger being so configurated that said primary fluid pressure is effective when the primary fluid is flowing to force said plunger to a flow position in which said first named bore is uncovered, a positioning nut threadably engaging said plunger barrel and adapted for cooperative engagement with said housing to limit the travel of said plunger barrel.

References Cited in the file of this patent

UNITED STATES PATENTS

| Number | Name | Date |
|---|---|---|
| 578,683 | Tregurtha | Mar. 9, 1897 |
| 715,398 | Longuemare | Dec. 9, 1902 |
| 1,111,897 | Harrold | Sept. 29, 1914 |
| 1,592,305 | Lewis | July 13, 1926 |